Figure 1:
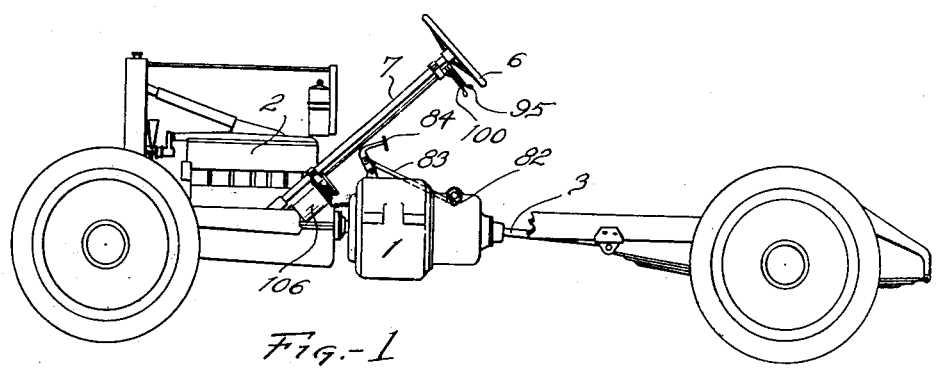

Nov. 11, 1924.

C. E. F. AHLM 1,515,322

CONTROLLING SYSTEM FOR ELECTROMAGNETIC TRANSMISSION MECHANISM

Filed Aug. 24, 1921   7 Sheets-Sheet 1

INVENTOR
Charles E. F. Ahlm,
BY Baker & Macklin,
ATTORNEYS

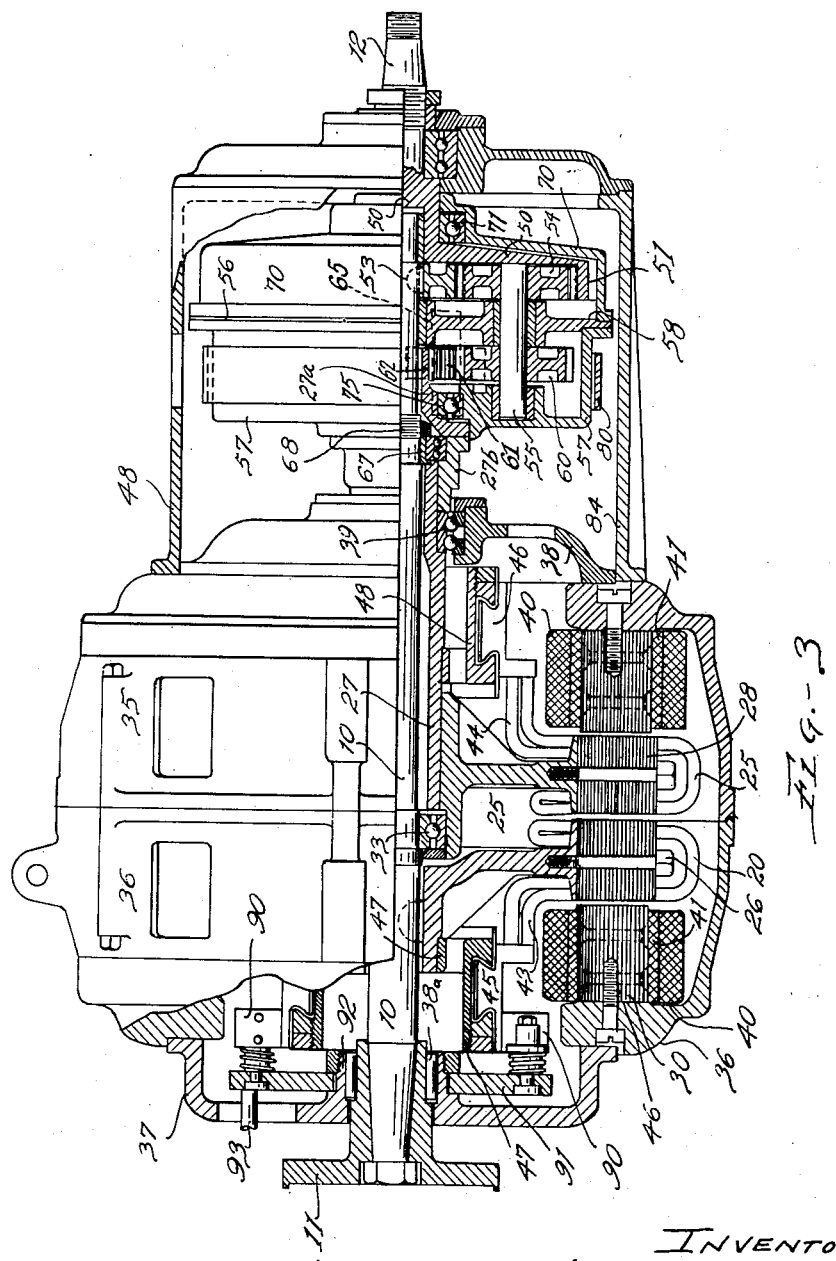

Nov. 11, 1924.
C. E. F. AHLM
1,515,322
CONTROLLING SYSTEM FOR ELECTROMAGNETIC TRANSMISSION MECHANISM
Filed Aug. 24 1921   7 Sheets-Sheet 3
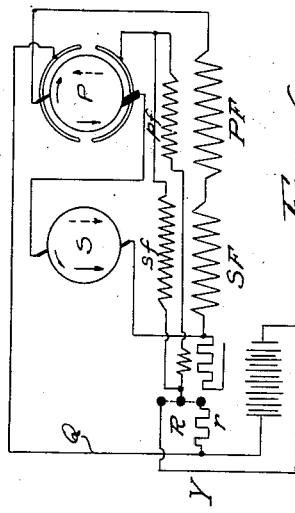
Fig. 6  Acc.1
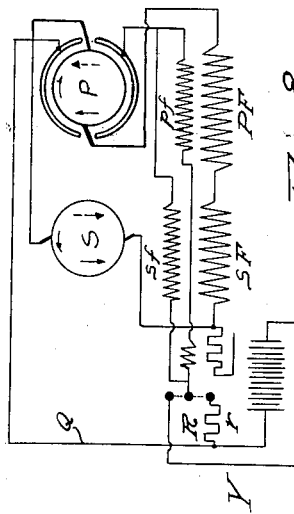
Fig. 8  Acc.3
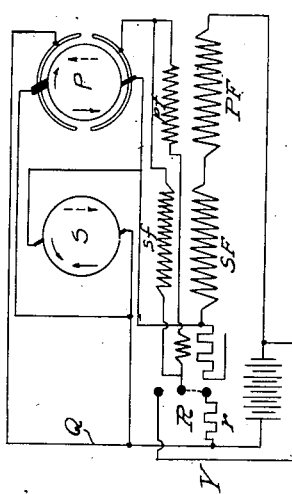
Fig. 5  Cranking
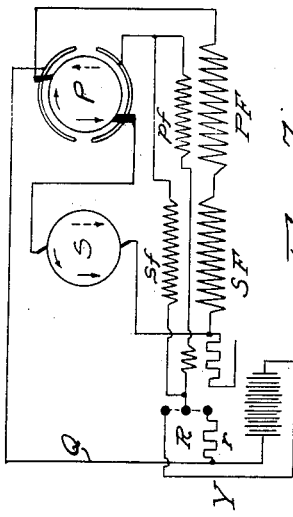
Fig. 7  Acc.2
INVENTOR
Charles E. F. Ahlm
BY Bates & Macklin
ATTORNEYS Nov. 11, 1924.
C. E. F. AHLM
1,515,322
CONTROLLING SYSTEM FOR ELECTROMAGNETIC TRANSMISSION MECHANISM
Filed Aug. 24 1921
7 Sheets-Sheet 4
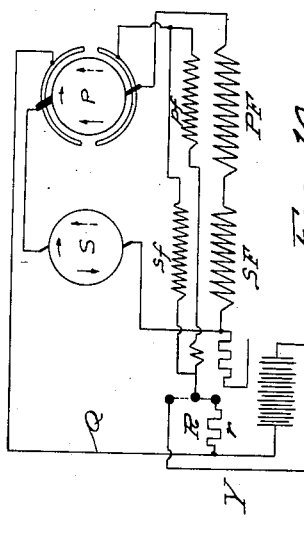
Fig-10 HIGH
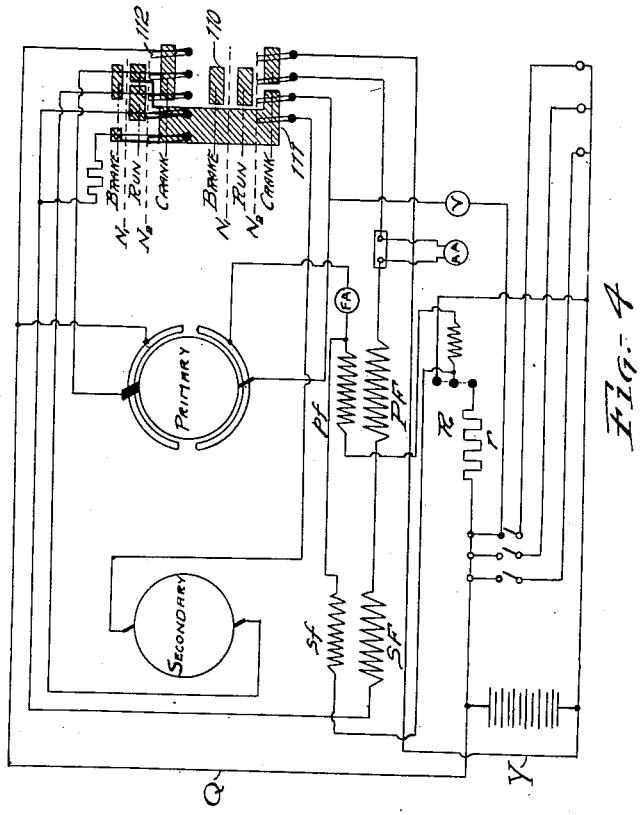
Fig-4
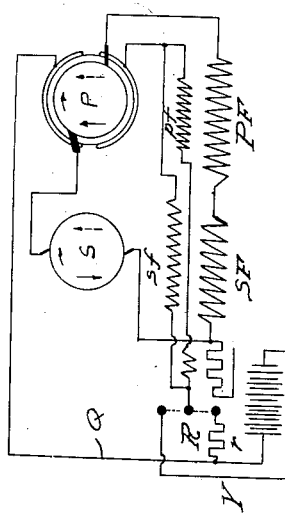
Fig-9 Acc. 4
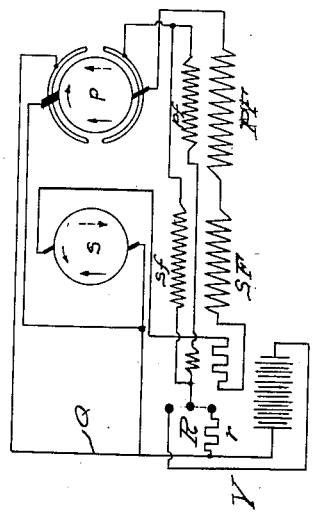
Fig-11 BRAKE
INVENTOR
Charles E. F. Ahlm
By Bates & Macklin,
ATTORNEYS.

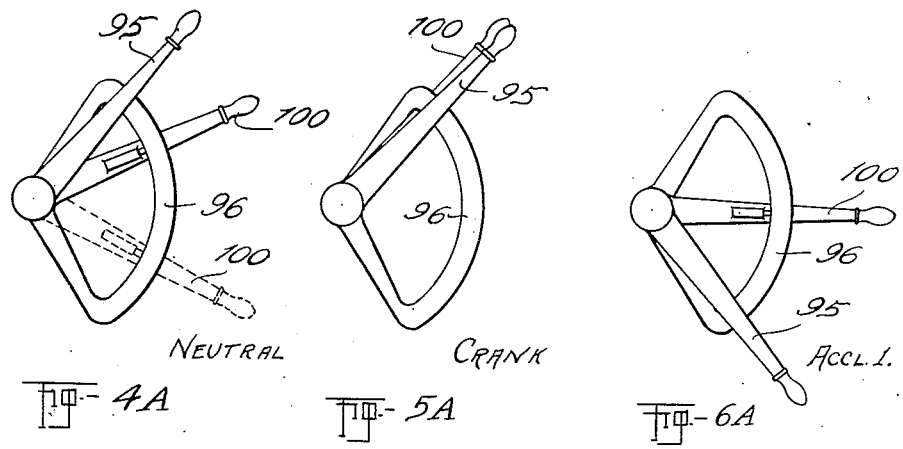
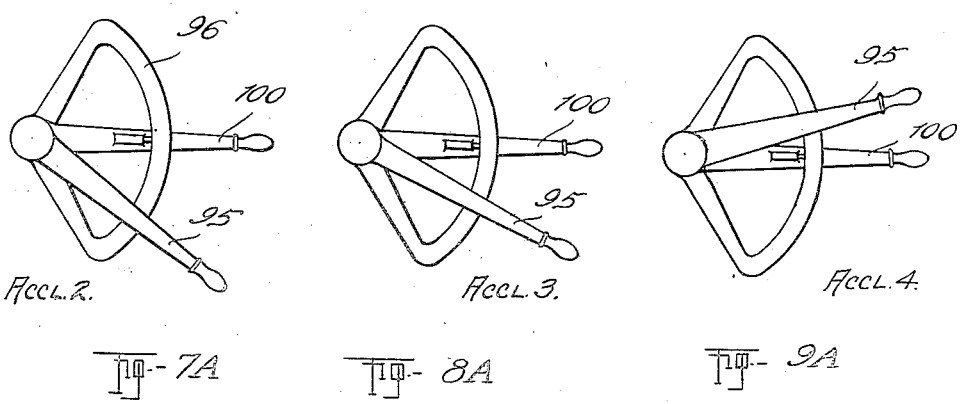
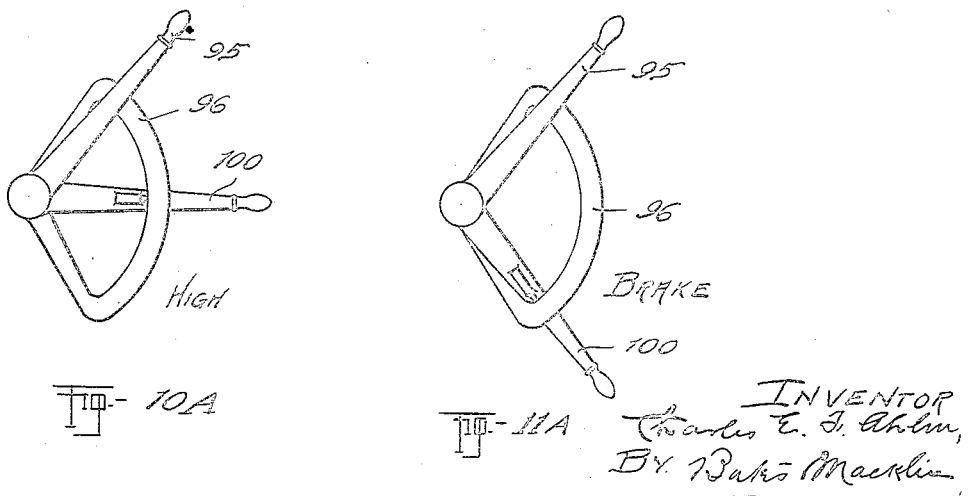

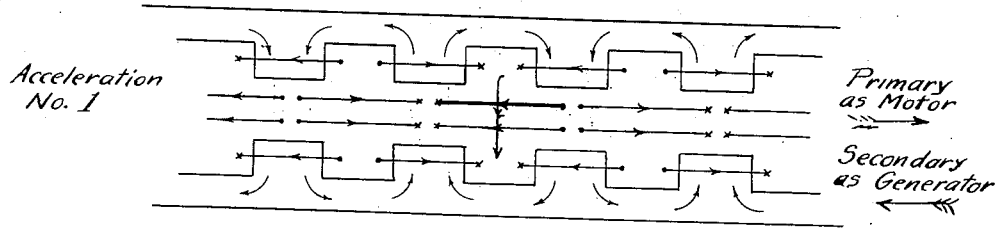
Fig.-6B — Acceleration No. 1 — Primary as Motor / Secondary as Generator
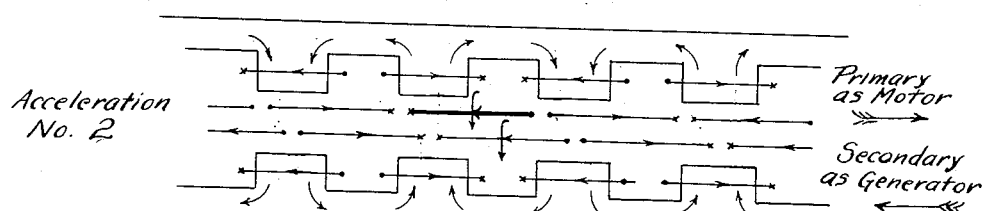
Fig.-7B — Acceleration No. 2 — Primary as Motor / Secondary as Generator
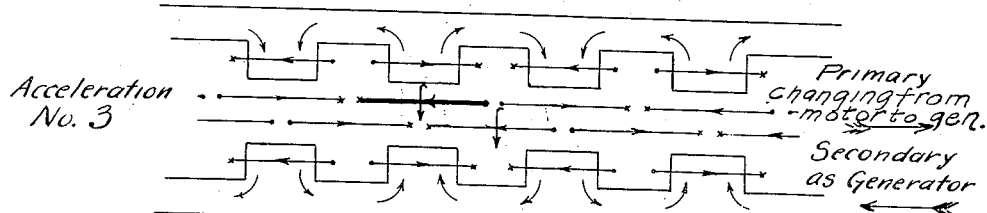
Fig.-8B — Acceleration No. 3 — Primary changing from motor to gen. / Secondary as Generator
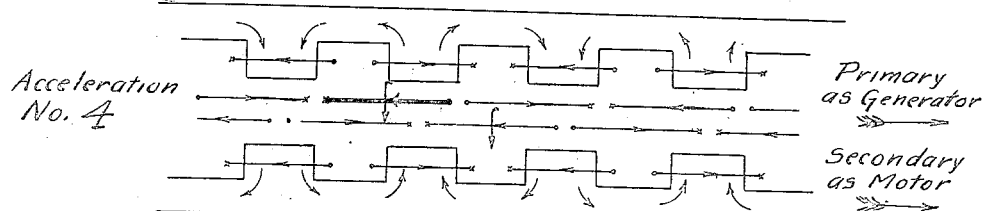
Fig.-9B — Acceleration No. 4 — Primary as Generator / Secondary as Motor
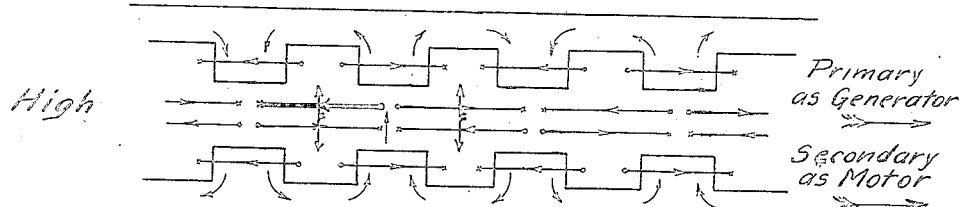
Fig.-10B — High — Primary as Generator / Secondary as Motor Patented Nov. 11, 1924.

1,515,322

UNITED STATES PATENT OFFICE.

CHARLES E. F. AHLM, OF CLEVELAND HEIGHTS, OHIO, ASSIGNOR OF ONE-HALF TO WM. A. NERACHER, OF WARREN, OHIO, AND ONE-HALF TO ALFRED FRITZSCHE, OF CLEVELAND, OHIO.

CONTROLLING SYSTEM FOR ELECTROMAGNETIC TRANSMISSION MECHANISM.

Application filed August 24, 1921. Serial No. 495,064.

*To all whom it may concern:*

Be it known that I, CHARLES E. F. AHLM, a citizen of the United States, residing at Cleveland Heights, in the county of Cuyahoga and State of Ohio, have invented a certain new and useful Improvement in Controlling Systems for Electromagnetic Transmission Mechanism, of which the following is a full, clear, and exact description, reference being had to the accompanying drawings.

This invention relates to means for controlling electro-magnetic transmission mechanism of the type wherein there are primary and secondary dynamo-electric machines and the power is delivered from the engine to the driven shaft, partly mechanically and partly electro-magnetically. The prior application of myself and Harry Y. Hall, No. 427,364, filed November 30, 1920, discloses a transmission mechanism of this type wherein the primary dynamo-electric machine is directly connected to the engine of an automobile and the secondary is connected by epicyclic gearing with both the engine shaft and the propeller shaft of the vehicle, and the present invention is particularly well adapted for use with such transmission mechanism.

One of the objects of the invention is to provide a controlling system which shall enable the machine to pass through successive stages of acceleration efficiently and without jerking; another object is to render the controller small and compact so that it may be conveniently installed on an automobile; another object is to provide very convenient manually operated means for effecting the various accelerations and other operations desired.

In the prior application referred to, we described a manner of electrically controlling the transmission. We used a controller having seven positions, one for cranking, five for acceleration and running and one for braking. With that controller, however, when accelerating or going from one position to the others successively, it is necessary to depend on sufficient momentum of the car to bridge over the interval of time in moving the controller from one position to another, as during this interval of time all electrical connections are broken. This may be very difficult when starting to accelerate a heavily loaded car on a grade for example. Furthermore, as the prior controller breaks and remakes the electrical connections during load, flashing and burning at the controller contacts will occur, to the damage of the controller. Likewise, a very large and heavy controller is necessary in order to accommodate seven positions, frequently making it difficult of installation in a car generally crowded for room.

In the prior controlling arrangement referred to, during the first running position, the secondary rotates backwards and is not only a reactor for the gearing, but at the same time is adapted to act as a generator returning some of its work to the primary as a motor and thus helping the engine. But, unfortunately, with that arrangement, one cannot continue the first running position for the full length of time the secondary runs backwards, for the reason that this backward speed of the secondary is only for a very short time greater than the speed of the primary, decreasing until it becomes zero and then reversing, so that the counter-electro-motor force of the primary motor (which may remain at a constant speed) soon more than counterbalances the voltage of the secondary. It was therefore necessary for me to use a second controller position, following shortly after the first position, where I short-circuited the secondary upon the series fields. In this position the secondary continued to act as a reactor but it did not at the same time return any of its work to the primary motor, and hence the machine was just that much less efficient in this second position than in the first position.

In my improved manner of controlling the electro-magnetic transmission which forms the basis of the present application, I reduce the counter-electro-motive force of the primary motor as the reducing speed of the secondary generator reduces its electromotive force, so that notwithstanding the decrease in voltage of the secondary generator I keep its amount above that of the primary. This enables me to continue the use of the secondary as a generator, returning power to the primary as a motor, throughout substantially the entire time that the secondary is running backwards.

I accomplish the above result of reducing the counter-electro-motive force of the primary by shifting the brushes thereof. I connect these brushes by a suitable mechanism with an operating handle accessible to the operator at the wheel, so that he may shift the brushes during the acceleration to reduce the primary voltage continually in advance of the reduction of the secondary voltage, thus maintaining the smooth running of the car notwithstanding its continuous acceleration.

The construction enabling the above operation, as well as the electro-magnetic actions obtained, will be clear from a detailed description of the mechanism and circuits shown in the drawings.

Figure 2:
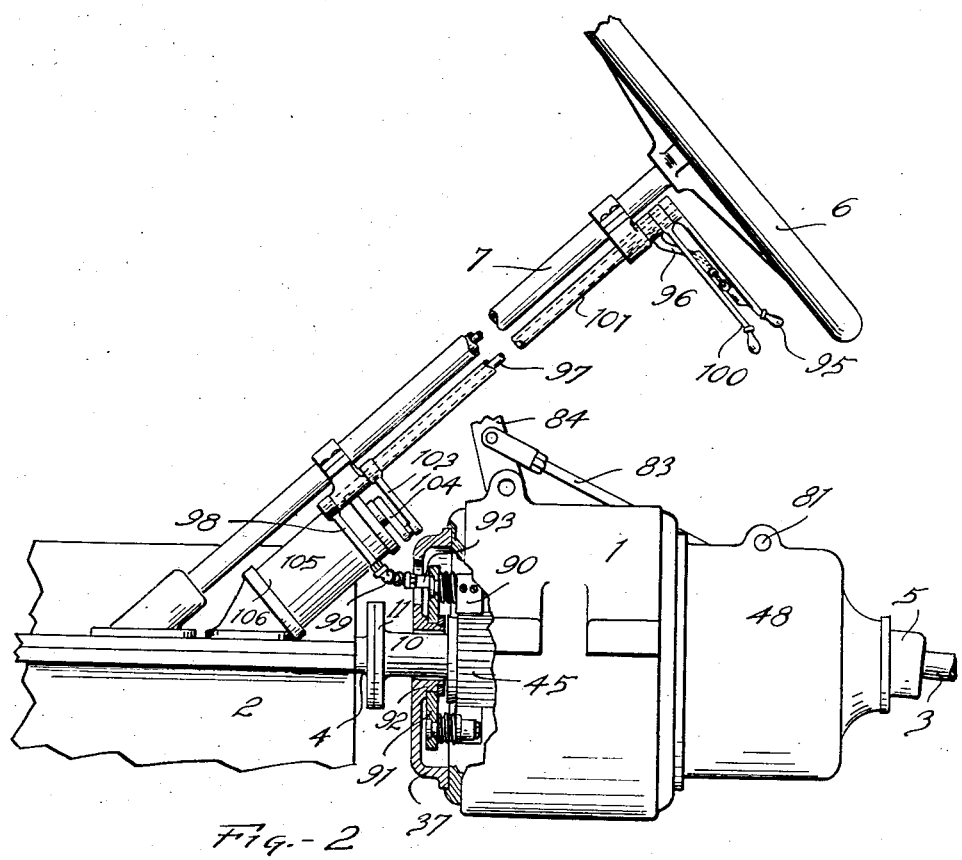
Figure 12:
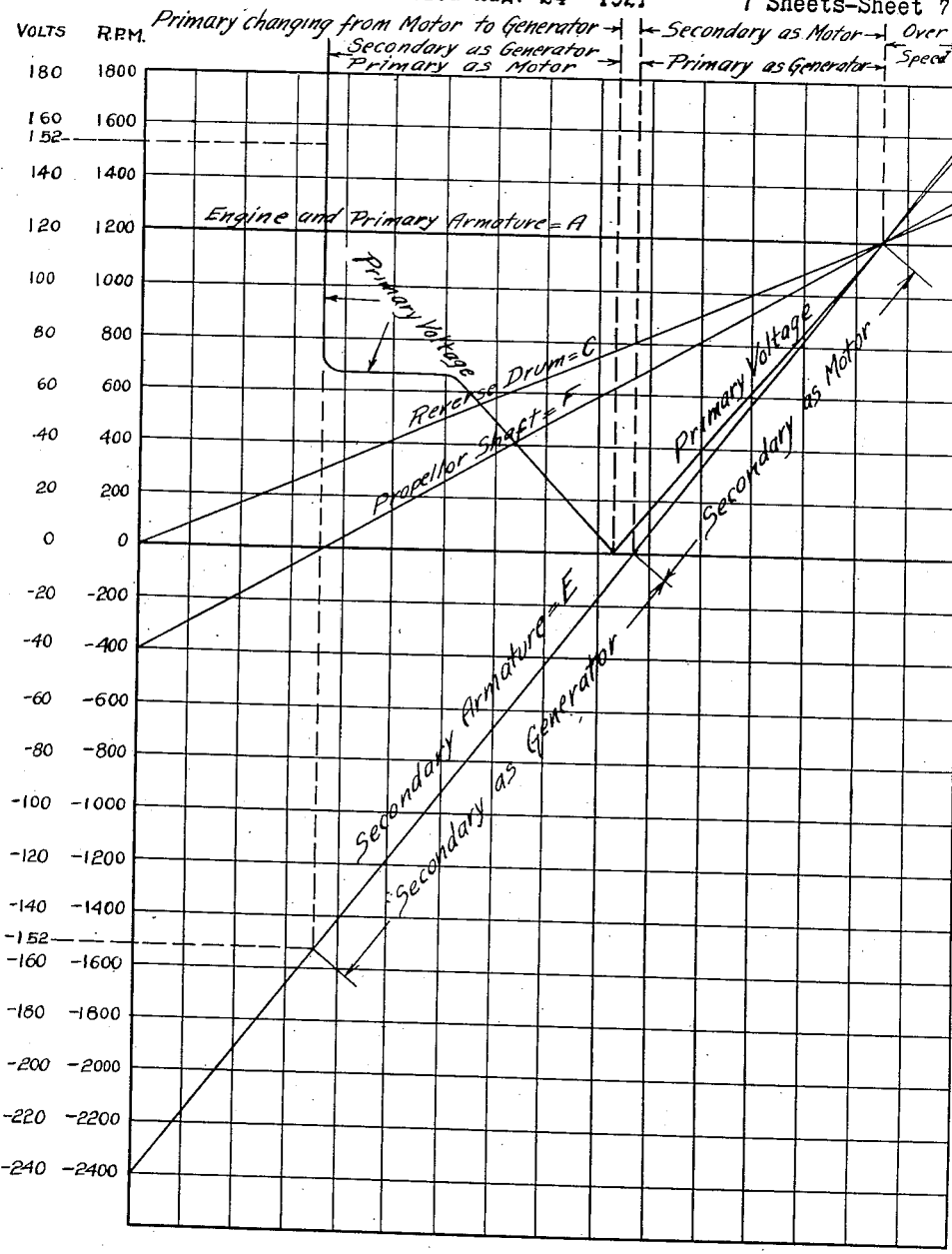
Figure 13:
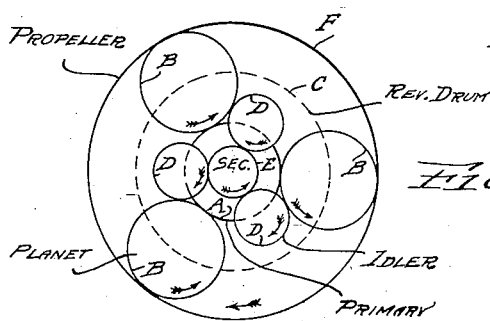

In the drawings, Fig. 1 is a side elevation illustrative of an automobile having my electro-magnetic transmission mechanism and its controlling means; Fig. 2 is a side elevation on a larger scale of the transmission mechanism and controlling means; Fig. 3 is a sectional side elevation on a still larger scale of the transmission mechanism itself; Fig. 4 is a diagram illustrating the controller and circuits; Figs. 5 to 11 inclusive are diagrams illustrating the circuits for various conditions, namely, for cranking, for five successive positions and for braking; Figs. 4^A to 11^A inclusive are diagrams of the controller levers in positions corresponding to the circuits of Figs. 4 to 11; Figs. 6^B to 10^B are flux diagrams for connections corresponding to Figs. 6 to 10 and 6^A and 10^A; Fig. 12 is a chart illustrating the mutual speed ratios of the various members of the transmission mechanism; Fig. 13 is a diagram illustrative of the relative rotations of the different parts of the transmission mechanism.

Referring first to Figures 1, 2 and 3, the numeral 1 designates the casing of my transmission mechanism, 2 the automobile engine and 3 the propeller shaft of the vehicle. The engine shaft 4 is provided with a head by which it is connected to the head 11 on the shaft 10 of the transmission mechanism. The transmission mechanism drives mechanically and electro-magnetically, a driven shaft 12 (Fig. 3) which is connected by a universal joint 5 with the propeller shaft of the vehicle.

20 indicates the primary electro-magnetic unit which is mounted on and rigidly connected with the shaft 10. This primary unit is in the form of an armature, the field for which may also constitute the field for the secondary unit. This secondary unit has an armature unit 25 lying alongside of the member 20 and mounted on a sleeve 27 surrounding and coaxial with the shaft 10.

As shown, the field structure for the two armature members consists of opposed poles 30 carrying suitable windings and mounted on the inner sides of a stationary ring-like frame preferably composed of two facing cup-shaped parts 35 and 36. This frame is suitably supported by means (not shown) upon the chassis of the automobile. The frame 35, 36 carries at the engine end a stationary dish-like cap 37, which forms a bearing 38^a for the shaft 10, a roller bearing being shown about the hub of the head 11. On the opposite end of the frame end 35 is a dish-shaped cap 38 which carries a bearing for the sleeve 27, a ball-bearing 39 being shown for this purpose. The sleeve 27 and secondary member 25 also have a bearing 33 on the shaft 10.

In Fig. 3, I have shown on the pole pieces 30 a main winding 40 and a shunt winding 41, and I prefer to arrange the poles which are opposite each other as north and south poles respectively, the iron portion of each armature serving to carry the lines of force to the other armature. 43 and 44 designate the armature conductors of the primary and the secondary units respectively. These conductors terminate in commutator bars 45 and 46 which are mounted on suitable ring-like members 47 and 48 mounted respectively on the hub of the armature 20 and sleeve 27.

Commutator brushes for the secondary armature (not shown) are non-shiftable and may be carried by suitable means projecting through openings in the end cap 38. The commutator brushes 90 for the primary armature are shiftable about the commutator 45. They are carried by a disk-like member 91, rotatably mounted on the hub 92 of the cap 37, and mechanically connected with an operating lever 95 adjacent to the steering wheel.

I may mount the brush-shifting lever 95 directly beneath the automobile steering wheel 6, this lever swinging across a stationary segment 96 after the manner of the ordinary hand throttle or spark control lever. I have shown the lever 95 as a rock arm on the upper end of a rock shaft 97 on the lower end of which is a rock arm 98 connected by a link 99 to a stud 93 projecting from the ring 91.

It is convenient to associate the brush shifting lever with the controlling lever. I have shown the brush-shifting lever 95 as extending over the segment 96 and a controller 100 as extending below the segment, though of course this arrangement is purely optional. I may mount the rock arm 97 within a tubular shaft 101 which is rotatively carried by the steering column 7, and I may secure the controller lever 100 to the upper end of this shaft while at the lower end is a rock arm 103 connected by a link 104 with the barrel 105 of a suitable controller. This controller may be conveniently placed in a casing 106 suitably carried by the engine frame alongside of the lower end of the steering column. It may, however, be in any other position desired.

I will now describe the planetary gearing which connects the propeller shaft with both the engine shaft and the secondary sleeve. The driven shaft 12 has a cup-like head 50 carrying an internal gear 51. Rigidly secured to the main shaft 10 is a sun gear 53 in the same plane with the internal gear 51. Between the sun gear and the internal gear are planets, three being shown and designated 54, these planets meshing with both the sun gear and the internal gear. The planets 54 are rigidly secured to short shafts 55 which are rotatably mounted in a disk-like member 56 loosely journaled on the shaft 10. Rigid with this disk-like member 56 is a cup-like member 57 in which the other end of the shafts 55 have a bearing. Between this bearing and the bearing in the member 56 these shafts have tightly mounted on them planetary gears 60 of the same size as the gears 54, and meshing with idlers 61, which mesh with a sun gear 62 on an extension 27ª of the sleeve 27. The idlers are mounted on shafts 65 which may be mounted in the members 56 and 57.

The extension 27ª is rigidly bolted to a sleeve 27ᵇ which is tight on the sleeve 27. The parts 27ª and 27ᵇ are in effect part of the sleeve, and will be so referred to herein, but for convenient installation and the provision of suitable bearings they are preferably made of detachable parts. The sleeve 27ᵇ is preferably threaded on the sleeve 27 and serves to clamp one of the race members of the bearing 39; it also carries the outer race member of the bearing 67, the other member of which is clamped to shaft 10 by a nut 68.

Rigid with the planetary carrier 56 and 57 referred to is a third member 70, which with the member 57 forms a complete casing for the planetary gearing. 71 indicates a suitable bearing between the member 70 and the hub of the propeller shaft head 54. A bearing 75 is also provided between the member 57 and the sleeve extension 27ª.

It will be seen that the construction described provides planetary gearing between the main shaft 10, the propeller shaft 12, and the secondary electro-magnetic unit 25, adapted to produce the following results:—
If the secondary be stationary the propeller shaft will be driven in the same direction as the main shaft and at a lower speed through the planetary reaction; if the propeller shaft be stationary the secondary through planetary reaction will rotate in the opposite direction to the main shaft and at a higher speed; if the planetary cage be held so that the axes of the planets can not travel, the gears act as train of spur gears and rotate both the propeller shaft and the secondary in the opposite direction to the engine shaft, the propeller shaft being slower and the secondary faster than the engine shaft. Various degrees of movement may be transmitted to the propeller shaft by electro-magnetically causing the secondary to lag behind the movement which the planetary gearing tends to give it.

To reverse the car, I simply apply a brake to the planetary cage which, when it holds this cage stationary, causes the planets 54 to act simply as idlers between the sun gear 53 of the internal gear 51, thus giving the propeller shaft a rotation in the opposite direction of the shaft 10. Slippage of the brake will allow the propeller to have a compound movement, partly by this idler gear transmission and partly by the planetary transmission.

The rotatable housing 57 provides a very convenient member for the application of the reversing brake. Extending around the cylindrical face of this housing I have shown a brake band 80 which is connected in any usual manner with an operating rockshaft 81 mounted on the casing 48. A suitable rock-arm 82 (Fig. 1) on this rock-shaft is connected by a link 83 with a foot pedal 84 whereby forward pressure on the pedal will apply the brake.

In this electro-magnetic transmission mechanism, each dynamo-electric machine is at times a generator and at other times a motor. The current generated by either machine may be used by the other to contribute torque or speed to the driven member, the surplus current going into the storage battery. In cranking, this battery current may operate both units as motors and in certain running positions both units may be generators charging the battery.

In running, the propeller shaft receives its power from the main shaft 10, partly mechanically through the gearing and partly electro-magnetically, either by reason of the primary boosting the engine where high torque is required, or by means of the secondary through the gearing contributing to the rotation of the propeller shaft. It follows that with a given speed of rotation of the engine shaft the propeller shaft may receive all speed within the range of the mechanism by simply electrically varying the relative rotation of the primary and secondary. This variation is effected by simply shifting the brushes of the primary machine into various positions, as will be hereinafter described in connection with the diagrams on sheets 3—6. Before taking up that description, however, I will explain the action of the specific planetary gearing shown—such explanation being largely an extract from the prior application mentioned.

The fundamentals of the planetary gearing shown in Fig. 3 are illustrated in the diagram Fig. 13. In the diagram A corresponds to the sun gear 53, which is rigidly connected at the engine shaft, as is also the electric armature member 20. The member A, therefore, may be designated "the primary." B indicates the two sets of planet gears 54 and 60, which are rigidly connected by the shaft 55, and thus may be considered a single broad gear meshing with both the primary sun A and the idlers D, corresponding to the gears 61. These idlers mesh with the secondary sun 62, (which by means of the rigid sleeve members 27$^a$, 27$^b$, and 27 is connected with the secondary armature 25) this sun being indicated by the circle E, which may be referred to as "the secondary." The propeller rigidly connected with the internal gear 51 meshing with the gears 54 in the diagram is indicated by F. C in the diagram indicates the rotary carrier for the planets and idlers, which, in mechanical construction, is composed of the plate 56 and the housing members 57 and 70, all of which rotate as a unit. As the member 57 constitutes the drum to which the brake band 80 is applied for effecting reversing, this whole member, designated C, may be conveniently referred to as "the reversing drum."

Due to the mutual gear connection between the various parts, the operation of the propeller shaft, the reversing drum and the secondary will be mutually dependent, and the results to any two of them from a given speed of engine shaft rotation depends on the condition of the other one of these three mutually connected members. It will, therefore, be convenient to consider what happens when anyone of these three members is stationary, assuming always that the engine shaft is making a definite speed of rotation.

Let us assume, by way of illustration that the speed of rotation of the engine shaft be 1200 revolutions per minute, which is accordingly the speed of rotation of the primary sun A in Fig. 13. Also assume that the diameter of the primary sun A is ⅓ of the diameter of the internal gear F, and that the secondary sun E is ½ of the diameter of A. The planetaries B will then, of course, be of the same diameter as A.

Let us take first the condition when the reversing drum is held stationary, as it may be by the application of the brake band 80. This may be expressed by the statement that C equals zero. Now, if the primary A be given one rotation, the gear B will have one rotation and the idler D will transmit two rotations in the opposite direction to the secondary E, which will thus have minus two rotations. At the same time the propeller shaft will have been driven in the reverse direction ⅓ of a rotation by the complete rotation of the gear B on the now stationary axis.

The above gives us the following results:
$$A = 1$$
$$C = 0$$
$$E = -2$$
$$F = -⅓$$

Multiplying this by 1200 to give the primary the assumed rotation, we have
$$A = 1200$$
$$C = 0$$
$$E = -2400$$
$$F = -400$$

Now, if F (the propeller shaft) should be held stationary (as it may be by applying the vehicle brake not shown) then with each rotation of the primary sun A the planets B, which are of the same size, must make one rotation, and in doing this they must roll on the now stationary internal gear F. The pitch circle of this gear is three times the circumference of the gear B and, therefore, when B rolls once around on the gear F, its axis travels ⅓ of a rotation. For the planetary system to make a complete rotation, it is therefore necessary for the B gears to make three rotations, and this requires four rotations of the primary A, that is, three rotations on account of the three required rotations of the planets B, and one rotation on account of the travel of the axis of these planets. Now, for each rotation of the gear B, the secondary E, which has half the diameter, receives two rotations and in the opposite direction due to the idler D. Accordingly the three rotations of the planets then give minus six rotations of the secondary, but the whole travel of the planetary system takes up one rotation in the plus direction, so that the net result is minus five rotations for E.

In accordance with the above we have the following results:
$$A = 4$$
$$C = 1$$
$$E = -5$$
$$F = 0$$

Now as we assume that A is to have 1200 revolutions, we multiply the above figures by 300, giving us the following:
$$A = 1200$$
$$C = 300$$
$$E = -1500$$
$$F = 0$$

Under these circumstances the secondary is rotated in the opposite direction to the primary and at a speed 25% in excess thereof. The car being stationary, the only operation is to charge the battery.

If it be desired to plot curves illustrating the mutual speed ratios of the different members, this may be readily done from the equations above given, since these equations give us two points on each curve, and as the gearing cannot change, the ratios must be proportional for all other speeds and, hence, each curve must be a straight line. Therefore, locating points on a chart corresponding to the equations given, and drawing a straight line through the two points for each member, we have a chart showing four straight lines, as appears in Fig. 12.

Explaining the chart, Fig. 12, more in detail, a sheet is ruled with horizontal lines representing convenient numbers of rotations, and one of the intermediate horizontal lines is selected as a zero line. As the engine speed is constant it will be represented by a horizontal line the proper distance above this zero line. I am assuming that the engine makes 1200 revolutions per minute, and therefore, the primary speed line is drawn at 1200.

The reversing drum line has one point at zero as indicated by the first set of equations, and another one intermediate of zero and the primary line. I, therefore, select a point on the zero line, and another point further along in the chart above the zero line equal to 300 revolutions, and draw the line representing the reversing drum through these two points. When the reversing drum is zero, the propeller shaft is making minus 400 revolutions, and when the reversing drum is rotating 300 revolutions the propeller shaft is zero. I, therefore, select directly below the reversing drum points of zero and 300, these two points of minus 400 and zero for the propeller shaft line, and draw a straight line through these two points. Similarly the two sets of equations give us for the secondary minus 2400 and minus 1500, and selecting these two points we have two points on the secondary. The chart is subdivided vertically into units denoting time, and I thus have a graphical illustration of the speed ratios of the various members at any given time.

All the lines on the chart will meet at a point where speed or rotation of all the parts is the same, which must be plus 1200 as that is the constant speed of the primary. As proving these lines will all meet in a point, consideration may be given as to what would take place if the secondary were rotating in the same direction and at the same speed as the primary. A would then equal plus 1200 revolutions, and E would equal plus 1200 revolutions. Now, the 1200 revolutions of A would give minus 1200 revolutions to B. For B to revolve in the minus direction 1200 times, while E is revolving the plus direction 1200 times, it is necessary for B to travel 1200 revolutions, and such travel would give the reversing drums C plus 1200 revolutions. As the travel of B would counterbalance the revolutions thereof, this gear would act as a strut between A and F causing F to have the same number of revolutions as A, or plus 1200 per minute.

It will be seen from the chart that, as already stated, when the reversing drum is held at zero the propeller shaft rotates in the opposite direction at a reduced speed, which is proper for reversing movement of the car. The point where the propeller line crosses the zero line is the standing position of the car, the secondary is then rotating in the reverse direction to the primary and at an increased speed. As the speed of the propeller shaft increases, that of the secondary becomes equal to it and then gradually less, until the secondary becomes stationary and thereafter revolves in the same direction as the primary, though at a slower speed until the point is reached where all the members are rotating at the same speed. Above this speed, the propeller shaft, the secondary and the reversing drum are all rotating at a faster speed than the primary, as indicated by the chart.

The number of armature turns for each armature is equal. Hence, when the secondary is rotating in a reverse direction at maximum speed, the voltage of the secondary greatly exceeds the primary voltage, thus affording a large current for the primary, which greatly facilitates the starting of the vehicle.

In order to continue the use of the secondary as a generator, returning power to the primary as a motor, during the entire time that the secondary is running backwards, as regards the primary, it is necessary that the voltage of the primary, (i. e. the voltage that the primary would give as a generator run at constant speed by the engine) be continually reduced as the speed of the secondary is reduced and as the acceleration of the car proceeds. This is accomplished by shifting of the primary brushes against the direction of rotation of the primary, the reduction of this primary voltage is indicated by the line marked "primary voltage" on the chart.

Starting with connections as they are when the propeller shaft is idle, the primary brushes are shifted through 90 electrical degrees within the time the secondary goes to zero speed. At about this point the voltages of both primary and secondary become zero, and the secondary reverses its rotation and also reverses its polarity as the field connections remain the same. A further shift of the primary brushes will reverse the primary armature connections, thus changing the primary to act as generator and the secondary as motor which condition will continue until the speed of both primary and secondary are equal.

If the primary voltage is decreased in the same ratio as the decrease in speed of the secondary, the voltages of both would reach zero at the same time; that is at the time the secondary speed becomes zero, and thus at this point there being no E. M. F. acting in the circuit, there would be no current flowing and no reaction of pull exerted. To overcome this, the voltage decrease of the primary is accomplished somewhat faster than the decrease in speed of the secondary so that the primary reaches zero voltage ahead of the secondary, as clearly shown by the chart. From this moment until the secondary reaches zero speed or zero voltage, the secondary continues to act as a generator, while the primary is changing from a motor to a generator.

It will be noted that on the chart the primary voltage is considerably decreased at the starting position and as the propeller shaft gradually increases in speed the primary voltage is maintained constant through a certain medium voltage period, after which it is gradually decreased to zero as the speed of the secondary, and consequently the voltage thereof, decreases to zero. It is desirable that this condition be brought about in the practical operation of the device, for it is important to have a considerable difference in potential between the primary and secondary so that the secondary will present sufficient mechanical reaction for the sun gears to overcome the friction and the inertia of the standing automobile. Hence the operator should immediately shift the primary armature brushes through a considerable angular distance to decrease the effective flux and consequently the voltage of the primary during the starting period. This initial starting voltage of the primary may be anywhere from zero to a voltage equivalent to that of the secondary, i. e. 152 volts on the chart. It is shown, however, as being immediately decreased to approximately 68 volts, while the secondary is generating a pressure of 152 volts. This starting voltage may remain constant during a period in which the secondary voltage is decreasing, and when the secondary voltage has decreased to nearly that of the primary voltage, the operator may then gradually decrease the primary voltage by a further gradual shifting of the brushes, the primary voltage being continually kept lower than that of the secondary.

The exact point when the primary reaches the zero position will be dependent upon the shifting of the brush lever at the wheel. With a little practice, the operator will learn to shift this lever so as to bring the primary to zero very slightly in advance to the secondary coming to zero. In other words, he moves the brush lever to reduce the voltage of the primary slightly faster than the voltage of the secondary is automatically reduced by the machine.

The controller is, in effect, a positioning switch for setting the circuits for cranking, running or breaking. When it is set in the running position, the various running accelerations are effected by shifting primary brushes. By making the controller simply a positioning switch, I can make it small; furthermore, by providing it with two sets of contact fingers, and plates which may form bridges between them, I still further reduce its size.

The controller is indicated in the right hand portion of Fig. 4. It comprises various contact plates indicated by the cross sectioned areas designated 110, mounted on a rotary barrel and two sets of contact fingers 111 and 112 simultaneously cooperating with the plates. These fingers are shown as leading from binding posts indicated by black circles; the points of the fingers being the parts where they are supposed to engage the segments. As shown in the drawing, they are in one of the neutral positions, the controller providing two neutral positions, respectively between the cranking and running position and between the running and brake position. These two neutral positions are designated $N_1$ and $N_2$ in the diagram. Owing to the two sets of contact fingers the designations are duplicated on the diagram; the upper half of designations relating to the plates which contact with the set of fingers 112, while the lower half refers to the plates for the fingers 111.

As heretofore stated, the controller barrel is turned by the oscillation of the hand lever 100. The mid position of this lever is the running position, as illustrated in Figs $6^A$ to $10^A$ respectively. The uppermost position is the cranking position as illustrated in Fig. $5^A$, while the lowermost position illustrated in Fig. $11^A$ is the brake position. The two neutral positions are illustrated in Fig. $4^A$, one in full lines and the other in broken lines. These two neutral positions may be indiscriminate; when the lever is standing in either of them the transmission mechanism is idle.

For cranking the lever 100 is thrown in the uppermost position, Fig. $5^A$, and the brush shifting lever is also thrown in the uppermost position. After the engine has started, the controller lever is brought into the intermediate or running position shown in Fig. $6^A$ and the brush shifting lever is thrown down at the bottom as shown in that figure and then gradually lifted to cause the various accelerations until position shown in Fig. $10^A$, which corresponds to "high gear" is reached. If during running, it is desired to apply the electric brake, the controller lever is simply thrown down to the lowermost position as shown in Fig. $11^A$.

I will now describe the arrangement of circuits and the mutual action of the dynamo electric machines for the different positions; it being understood that the circuit diagrams numbered 5 to 10 correspond to the lever diagrams 5A to 11A; also that the mutual flux relation of the primary and secondary armature for the various running positions of these two sets of diagrams is shown in the diagrams 6B to 10B having corresponding numeral.

In the cranking position, Figs. 5 and 5A, the battery is connected with the two armatures (in parallel with each other) and each in series with the two fields. The brushes have the position shown in Fig. 5 and both machines are motors as indicated by the opposed arrows thereon. This gives a very effective cranking action.

Following the cranking, the controller lever 100 is moved to the intermediate position and the brush shifting lever is moved throughout its range, thus changing the brushes 180 electrical degrees. The parts and circuits thus have the relations shown in Fig. 6A and also in 6B. One of the brushes of the primary is shown heavier in the diagrams for the purpose of distinguishing it from the other brush. SF and PF indicate the series field for the secondary and the series field for the primary respectively, while $sf$ and $pf$ are the shunt fields for the secondary and primary respectively.

In the position of Fig. 6, which is the first acceleration position, the primary is a motor and the secondary a generator, (the full line arrows representing current and dotted arrows E. M. F.) and they are rotating in a reverse direction. The secondary forms an effective mechanical reactor and at the same time furnishes current to the primary as a motor, with which it is in series. The two shunt field windings are in parallel and are connected to a relay R which may connect the common line through a resistance $r$ to the return shunt line Q or may connect the common shunt line first to a line Y which leads to the battery from whence the circuit continues to the line Q. Such a transfer relay is shown, described and claimed in the Patent No. 1,352,166, issued to me September 7, 1920. It is effective to prevent connection to the battery until a sufficient current is flowing to properly charge the battery.

During the first acceleration position described, the relation of the primary and secondary armature so far as the flux is concerned is substantially as illustrated in Fig. 6B. Mechanically the armatures are rotating in opposite directions. The curved arrows in these flux diagrams illustrate the field flux. The straight lines, longitudinally of the diagram, represent the flow of current in the primary and secondary armature windings. The heavier transverse arrows indicate the direction of the local flux set up in the armature by the current flowing in the armature windings. It will be seen that these heavier arrows in Fig. 6B are in the same direction and in co-ordinated position, indicating that the flux set up in the primary and secondary armature windings is moving in the same direction and is concentrated intermediately of the field fluxes and out of interference therewith. This indicates that the two armatures have the maximum field flux reactions.

In this position the two armatures are subjected to the maximum field flux reactions and the maximum torque is being exerted, as the power of the secondary serves electrically through the primary to boost the mechanism drive.

Figs. 7, 7a and 7b illustrate a second acceleration position where the primary brushes have been slightly shifted, the flux in the primary armature, as indicated by the transverse arrow in 7b, is brought nearer the field flux which partly neutralizes the same. Hence the field flux acting on the primary armature is weakened, thereby causing a reduction in the primary voltage. This is substantially the flux condition which exists when the machine is being started. It will be noted on the diagram that the armature flux in the secondary still remains in quadrature with relation to the field poles. The relative displacement of the two armature fluxes, however, further increases the torque being exerted by the mechanism for the secondary armature flux has a tendency to follow the path of the primary armature flux. In other words, the two fluxes try to remain in co-ordinated relation. As the arrows to the right of the diagram indicate the direction of rotation of the primary and secondary armatures it is readily seen that this flux pull adds to the torques exerted on the armatures.

In Figs. 8, 8a and 8b, I have illustrated flux and current relations existing at a third acceleration position where the primary brushes have been shifted still farther. Here the primary armature flux is coincident with and directly opposed to the field flux. At this position the primary voltage will consequently be zero. When the primary is changing from a motor to a generator the secondary is still acting as a generator at a greatly reduced speed, generating only sufficient current to overcome the resistance in the primary circuit.

This is effected by shifting the primary brushes until the primary voltage is decreased to zero, the zero point being reached before the secondary voltage falls to zero.

Figs. 8, 8a and 8b illustrate conditions existing when the primary counter electromotive force has been reduced to zero and the secondary speed is coming to zero and ready to reverse. Since the armature coils in the two armatures are in quadrature either armature may be field for the other which maintains the flowing of current throughout the system. As the shunt connections are here broken and ready to be ready to be reversed, the condition would be unstable for no load or a very light load but for loads necessary during acceleration it will be more than sufficient for steady operation and no hunting will take place.

Figs. 9, 9ª and 9ᵇ the primary brushes are shifted still farther and the primary armature flux is moved out of coordination with the field poles, the flux is therefore not completely neutralized by the field flux.

The final running position is indicated in Figs. 10, 10ª, and 10ᵇ. In this position the primary armature brushes have been shifted until the primary armature flux is again in quadrature with the field poles but advanced 180 electrical degrees from the starting position and in coordinated relation to the secondary field flux. Since the current flowing in the secondary armature windings has been reversed the secondary armature flux will therefore neutralize the primary armature flux and no local magnetic reactions will be present between the primary armature and the secondary armature under normal running conditions.

The maximum flux strength of the primary and secondary fields of the primary is now present and the primary continues as a generator and the secondary as a motor.

An over speed may be obtained, if it is desired, by arranging the primary armature windings so that the number of armature coils is greater than the armature coils present in the secondary, thus the primary armature will generate a higher voltage than the secondary armature. With such a winding arrangement the flux conditions at normal running speed would be illustrated by Fig. 9ᵇ, and Fig. 10ᵇ would then illustrate the flux and current conditions existing at over speed. Thus an over speed may be given to the propeller shaft in excess of that of the engine shaft and the relative speeds of the secondary, propeller and primary would be as illustrated by extensions of the respective speed lines above the engine and primary armature speed line.

Figs. 11 and 11ᴬ indicate the braking position where the brushes are in the position of Fig. 10 but the controller has short circuited one armature on the other. In that case the primary continues as a generator while the secondary tends to become a motor rotating in the reverse direction, causing a quick reduction in the speed of the car.

It will be seen that the system of operation provided herein is adapted for simple mechanism and easy operation, while I have shown a number of different acceleration positions it is to be understood these are merely illustrative, as there are no definite fixed positions between the first and last running positions. The operator simply raises the brush-shifting lever as the acceleration builds up from more fuel being admitted to the engine. The operation is easily mastered and eliminates the jar and uneven running consequent upon shifting between fixed positions. The simplification of the controller resulting from this brush-shifting control method is also an advantageous feature of this invention.

Having thus described my invention, I claim:

1. The combination of an electromagnetic transmission mechanism, having field windings, a primary armature and a secondary armature, a driving member and a driven member associated with the armatures, an epicyclic gear train connecting the driving member to the driven member and one of the armatures to the driven member, brush shifting means associated with the other armature whereby the voltage of that armature may be decreased when the armature connected to the epicyclic train is being driven as a generator and whereby said voltage may be increased when the other armature is acting as a motor, and controller means for varying circuit connections between the armatures and fields to establish them for cranking, running and braking.

2. The combination of an electromagnetic transmission mechanism having field windings, a primary armature and a secondary armature arranged side by side, said windings being disposed on opposite sides of the armatures, a driving member, a driven member, epicyclic gearing connecting the driving member to the driven member and the secondary to the driven member, to enable power to be transmitted partly mechanically and partly electromagnetically, a brush shifting means associated with the primary armature, brushes carried thereby, whereby partial shifting of the brushes by said means will cause the voltage of the primary to be decreased when said secondary armature is being driven as a generator by the driving member through said epicyclic gear train and whereby a further shifting of the brushes may increase the voltage of the primary when the secondary is acting as a motor to drive said driven member through said epicyclic gear train, and controller means for varying circuit connections between the armatures and field windings to establish them for cranking, running and braking.

3. The combination of a driving member, a primary armature rotating therewith, a driven member, a secondary armature, planetary gearing having three members mounted coaxially and rotating with the driving member, the driven member and the secondary armature respectively, and having planet members mounted in a revolvable planetary carrier, stationary brushes for the secondary armature and shiftable brushes for the primary armature, and means for shifting the brushes of the primary armature.

4. The combination of a driving member, a primary armature rotating therewith, a driven member, a secondary armature planetary gearing having three members mounted coaxially and rotating with the driving member, the driven member and the secondary armature respectively, and having planet members mounted in a revolvable planetary carrier, a foot lever for applying a brake to the carrier, and a hand lever for shifting the brushes of one of the armatures.

5. In a dynamo-electro transmission mechanism, the combination of a primary armature directly connected with the driving device to rotate therewith, a secondary armature, a driven device, planetary gearing connecting the secondary armature with the driving device and the driven device whereby the secondary may rotate in either direction while the primary rotates only in one direction, including an independently revoluble planet carrier non-shiftable brushes for the secondary armature and means for shifting the brushes of the primary armature while the secondary is rotating in the reverse direction to reduce the counter-electro-motive force of the primary in advance of a reduction of the electromotive force of the secondary when being reduced consequent upon its reduction in speed.

6. In a dynamo-electric transmission mechanism for automobiles, the combination with the engine shaft and the propeller shaft of the vehicle, of a primary armature directly connected with the engine shaft, a secondary armature, planetary gearing connecting the secondary armature with both the engine shaft and the propeller shaft, a lever adjacent to the steering wheel of the vehicle, mechanism connecting said lever with the brushes of one of the armatures, whereby they may be shifted by the operator at the wheel, a controller adapted to vary the circuit connections to establish them for cranking, running and braking, and a lever adjacent the steering wheel for setting the controller in any of such three positions.

7. In a dynamo-electric transmission mechanism the combination with the engine shaft of a vehicle, of a primary armature directly connected with the engine shaft, a secondary armature, planetary gearing having members rotating respectively with the engine shaft, the propeller shaft and the secondary armature, and having planets carried by a rotary carrier, a brake for said rotary carrier, a foot pedal for operating said brake, a controller adapted to connect the circuits for starting and in a different manner for running, mechanism for shifting the brushes of the primary armature, and a pair of hand levers adjacent the steering wheel for operating the controller and the brush shifter respectively.

8. The combination with a driving member and a driven member, primary and secondary armatures, one connected with one of said members and the other connected through gearing with both members, series and shunt field windings, means for exciting the field for both armatures solely by the operation of one armature, fixed brushes for one armature and shiftable brushes for the other, and means for shifting the brushes of the latter armature.

9. The combination with a drive shaft and a driven shaft, primary and secondary armatures, one connected with one of the shafts and the other connected through gearing with both shafts, a shunt field winding, means for exciting the shunt field for one armature by the current flowing from the other armature, said secondary armature having stationary brushes and the primary armature having movable brushes, and means for shifting the brushes of the primary armature.

10. The combination with a primary armature and a secondary armature, a driving member directly connected with one of the armatures, a driven member connected through reaction gearing with the other armature and the driving member, series field windings and shunt field windings for the two armatures, means for connecting the series winding in series with both armatures while the shunt is about one armature only, fixed brushes for the secondary armature and shiftable brushes for the primary armature, and means for shifting the brushes of the primary armature to reduce the counter-electro-motive force thereof while the secondary armature is rotating in the opposite direction.

11. The combination with a driven member, of a pair of armatures, planetary gearing connecting such three members including an internal gear, a field structure on the outside of the two armatures and common to both of them, and means for shifting the brushes of one of the armatures.

12. The combination with a driving member and a driven member, of a pair of armatures side by side, one of them connected with the driving member, planetary gearing connecting the other armature with the driving member and the driven member the driven member carrying an internal gear, a field structure common to both armatures and including pole pieces on opposite sides of the two armatures, and means for shifting the brushes of one of the armatures.

13. The combination of two rotary armatures adjacent to each other, a field structure common to the two armatures and having pole pieces on opposite sides of the two, each armature serving to carry the lines of force for the other armature, a driven shaft, planetary gearing between it and the two armatures, including an internal gear between it and the two armatures, independent commutators for the two armatures, stationary brushes on one commutator, shiftable brushes on the other commutator, and manually controlled mechanism for shifting the latter brushes.

14. The combination of two independently rotatable armatures and a rotary member to be propelled, planets geared with such three members and mounted on a rotary carrier, means for controlling the rotation of the carrier, and means for shifting the brushes of one armature with reference to those of the other.

15. The combination of two rotary armatures, each having a sun gear, a rotary driven member having an internal gear, planets meshing with the sun gears and the internal gear, and means for varying the torque delivered by shifting the brushes of one of the armatures.

16. The combination of a main shaft, a driven shaft having an internal gear, a sun on the main shaft, a rotary planet carrier, a planet carried thereby and connected with the sun and the internal gear, a primary armature connected with the main shaft, a secondary armature having a sun geared with said planet, said secondary armature having stationary brushes and the primary armature having movable brushes, and means for shifting the brushes of the primary armature.

17. The method of controlling the dynamo-electric transmission mechanism wherein there is a primary armature connected with a driver and a secondary armature connected by epicyclic gearing with both the driver and the driven member comprising weakening the counter-electro-motive force of the primary while it is a motor by shifting commutator brushes to decrease the primary voltage to zero in advance of and while the voltage of the secondary is being reduced to zero due to the revolving thereof in the opposite direction as a generator at a decreasing speed.

18. The combination with a dynamo-electric transmission mechanism having a primary armature and a secondary armature and epicyclic gearing connecting the secondary armature with both the driving device and the driven device, fixed brushes for the secondary armature, shiftable brushes for the primary armature, a lever connected with such brushes and adapted by a continuous movement in one direction to first reduce the voltage of the primary armature substantially to zero and thereafter increase the voltage to substantially the initial amount, field windings connected to said brushes, and a controller means for varying the connections, whereby the field may be conditioned for starting, running and braking.

19. In a change speed gearing, the combination of a driving member, a driven member, two armatures, one connected with the driving member, planetary gearing connecting the other armature with both the driving member and the driven member, said planetary gearing including a rotary member, a controller for varying the circuits, shiftably mounted brushes for one of the armatures and a pair of hand levers for operating the controller and said brushes, and a foot lever for controlling said rotary member.

20. The combination of an electro-magnetic transmission mechanism having fixed windings, primary and secondary armatures, the primary armature having windings the armature turns of which are not less than the number of armature turns in the secondary armature, a driving member, a driven member, and gearing connecting the driven member to one of the armatures and to the driven member, whereby the secondary may be driven in a reverse direction as a generator and a relatively high voltage current may be impressed on the primary during acceleration of the driven member.

In testimony whereof, I hereunto affix my signature.

CHARLES E. F. AHLM.